Dec. 21, 1965 W. V. CHERY 3,224,300
AUTOMATIC TRANSMISSION
Filed Sept. 3, 1959 3 Sheets-Sheet 1
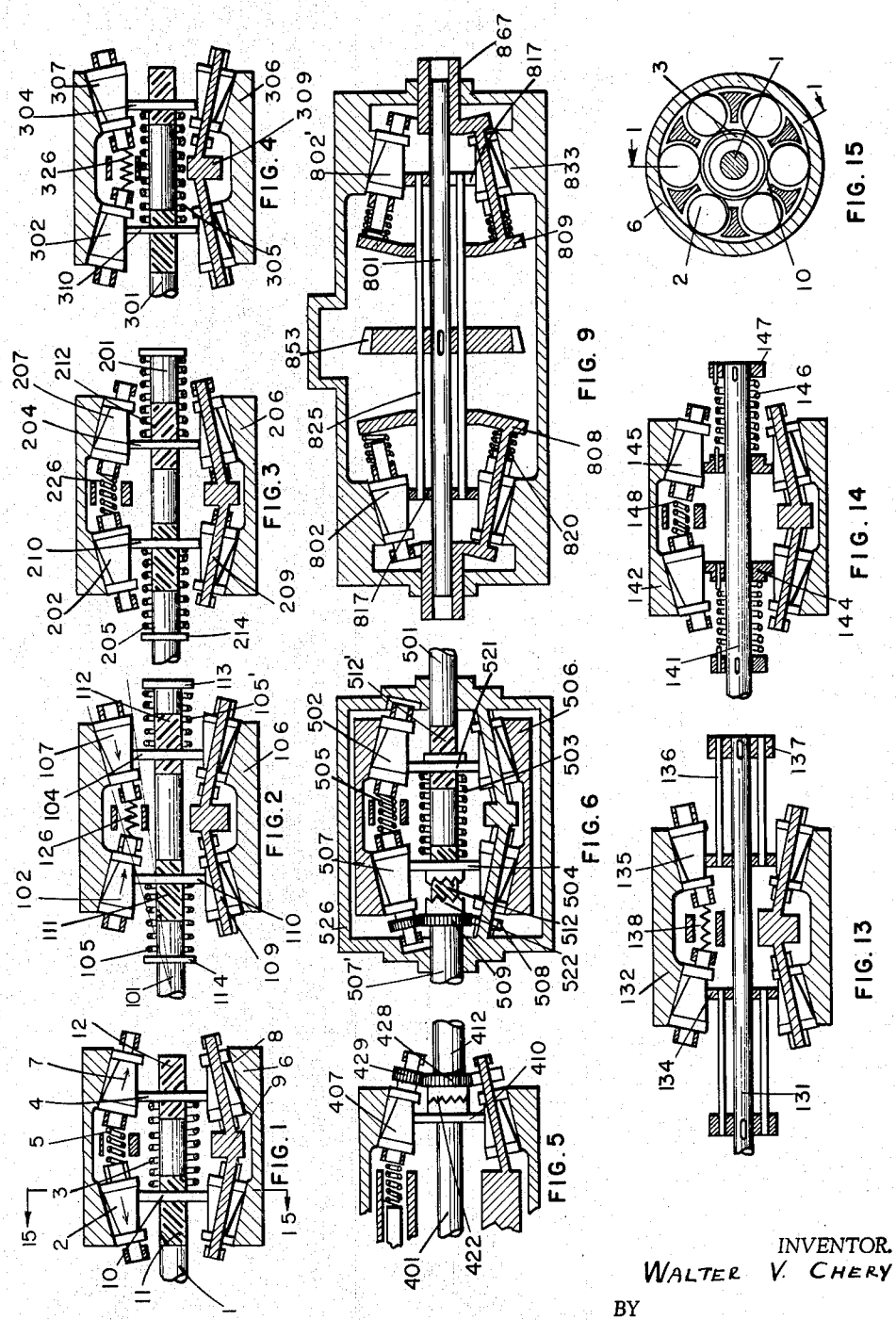
INVENTOR.
WALTER V. CHERY
BY
Charles L. Lovercheck
atty

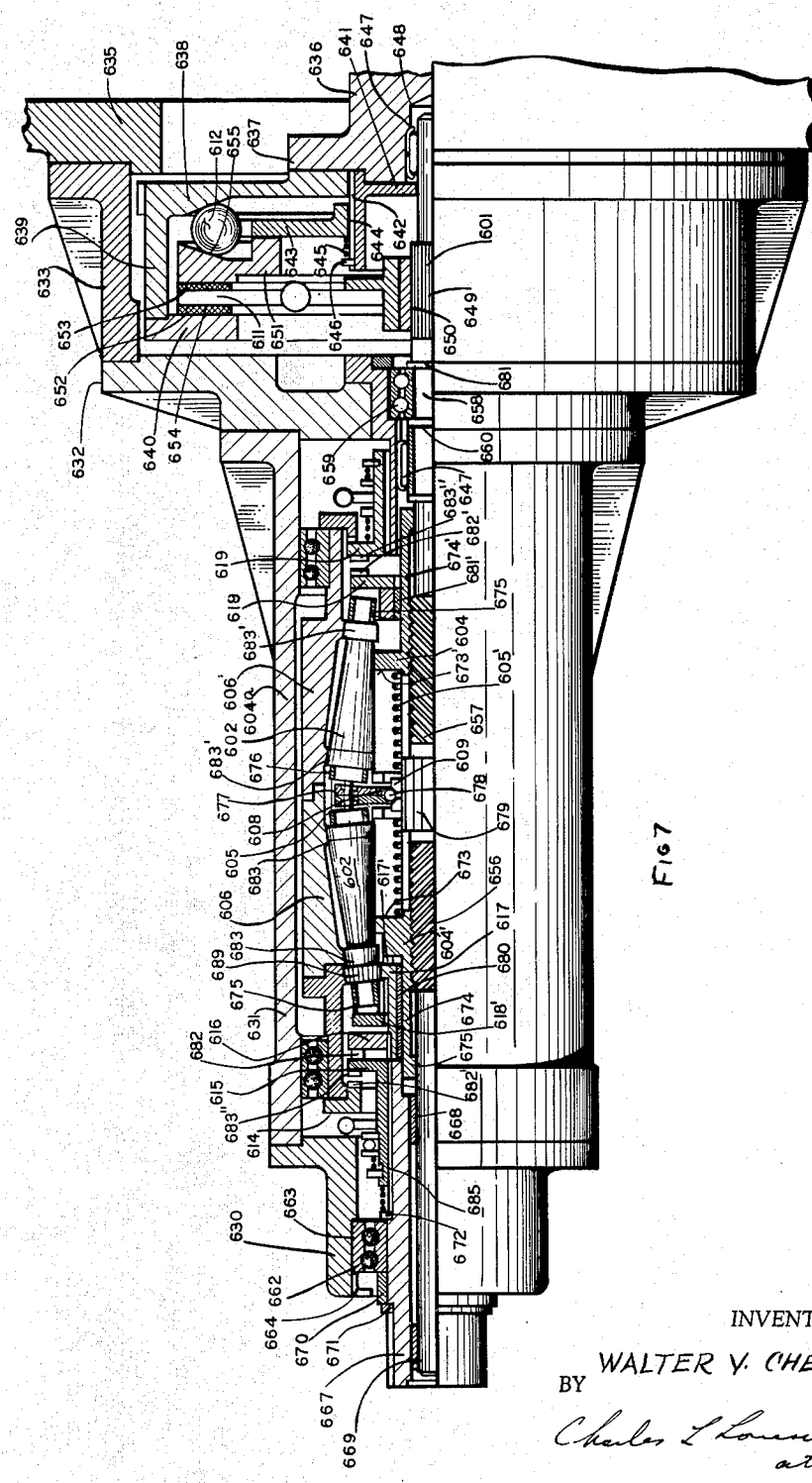

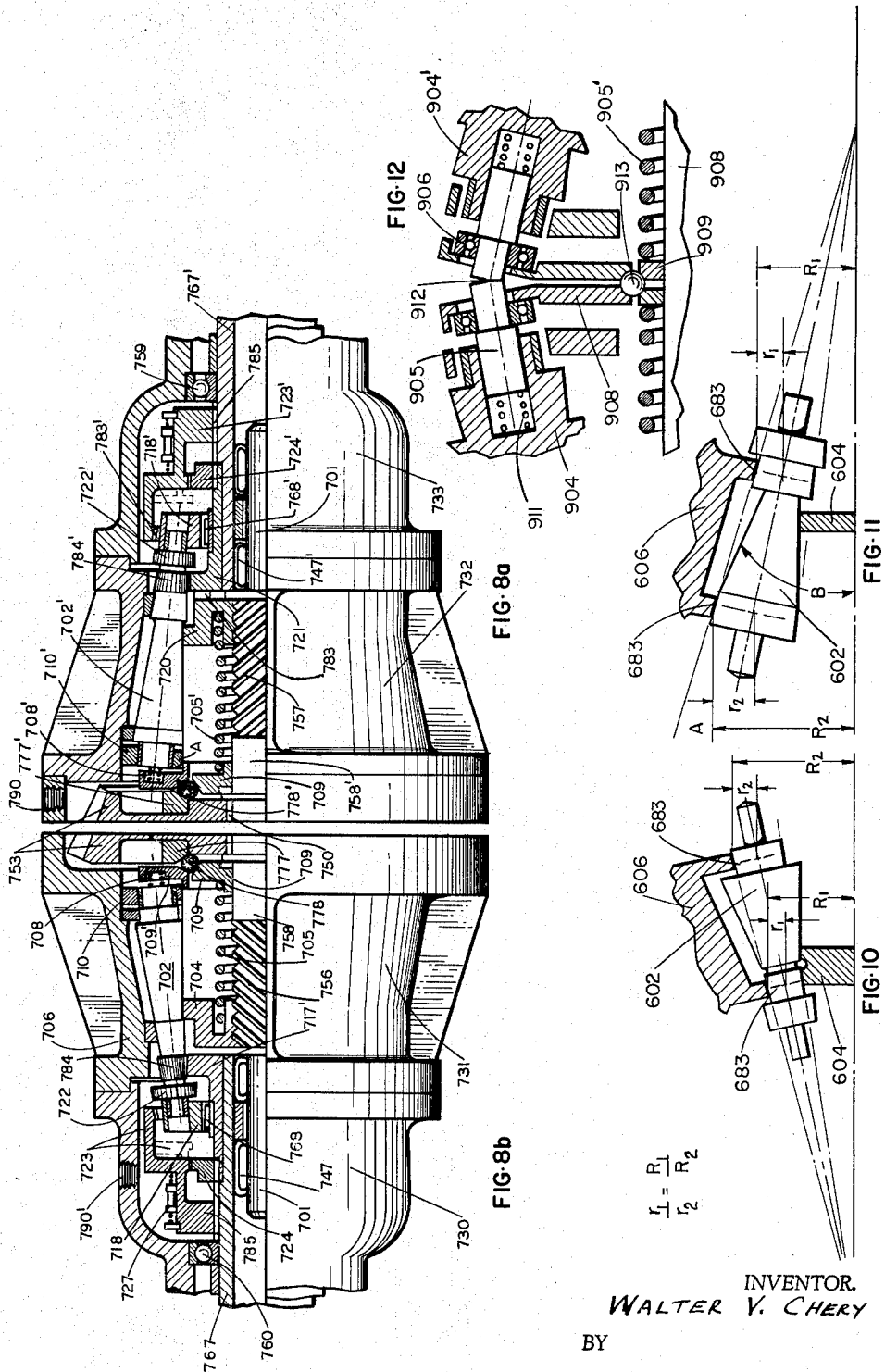

United States Patent Office 3,224,300
Patented Dec. 21, 1965

3,224,300
AUTOMATIC TRANSMISSION
Walter V. Chery, 908 Fairview Ave., Meadville, Pa.
Filed Sept. 3, 1959, Ser. No. 837,856
22 Claims. (Cl. 74—796)

This invention relates to transmissions and, more particularly, to automatic transmissions used in automotive vehicles and the like.

The design disclosed herein is based on the application of a special type of tapered roll disposed in planetary relation and located in planetary groups of two or more each, for example. In this way, the system is balanced. By maintaining rolling contact between the rolls in each respective group, the transmission will transmit higher torque and, therefore, greater power than any type of friction transmission heretofore made utilizing friction disks or the like.

By using a pre-load on the taper rolls along their axes by means of springs or by hydraulic pressure or the like, only a small force is required to develop a great pressure between the rolls and rolling members at the contact point. Prior existing types of transmissions required a great force in pre-loading to accomplish the same purpose.

By utilizing tapered rolls rolling on the housing, the unit acts similar to a pre-loaded roller bearing and, therefore, the wear of the parts is minimized. The same is true in another embodiment where tapered rolls are fixed in position but where the outer race rotates.

By using one shaft for both wheels and loading with a compression spring or torsion spring or by using a series of tension bars around the shaft, the torque control is positive and the system is balanced. The drawings show various other examples of structure to accomplish the foregoing.

The tapered rollers are designed in such manner that the transmission may operate at a ratio of 1—1 under normal speed. The angles of the outside of the rolls relative to their axes are selected in a manner that the speed of the parts involved at the contact point is the same and friction is thus avoided. Selection of different angles between tapered rolls and housing and tapered roller and the wheel provides maximum relation dimensionwise for respective parts.

With the foregoing in view, it is an object of the present invention to provide an improved automatic transmission.

Another object of the invention is to provide a transmission carrying out the advantages set forth above herein.

A further object of the invention is to provide an automatic transmission which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIGS. 1 to 6, 9, 13, and 14 show several schematic cross sectional views of embodiments of arrangements of the parts of a transmission according to the invention;

FIG. 7 is a longitudinal cross sectional view of another embodiment of the invention;

FIGS. 8a and 8b show other embodiments of the invention;

FIGS. 10 and 11 show enlarged views of the planetary rolls;

FIG. 12 is a view of another embodiment of the invention; and

FIG. 15 is a cross sectional view taken on line 15—15 of FIG. 1 and corresponding to a similar cross section which might be taken of the other embodiments.

Each of the embodiments of the transmission utilizes tapered rollers in combination with a self-adjusting wheel to change the torque transmitted continuously over a wide range. The wheels can be slid on the actuating shaft which has a multiple lead thread thereon. The angle of the lead of the thread is selected in a value which is greater than the angle of friction of the respective materials of the wheels and shaft.

When the output torque is low, the wheels are held by a spring in the position to provide a low ratio of r.p.m. and the output at that moment is maximum. When the torque of the output is high, the wheels will be pulled over by rotating the actuating shaft in the direction toward the opposite side and the r.p.m. of the output at that moment will be minimum. During this shifting period, the ratio of the input to the output will be changed continuously. This transmission could be built in several combinations to accommodate various conditions of input, output, and shifting. A coil, tension, or compression spring could be used or torsion bars as shown in FIG. 9 could be used.

Now with more specific reference to the drawings, FIG. 1 shows a generally schematic view of a cross section of a transmission according to the invention. Spaced frusto-conical shaped rollers 2 and 7 are arranged in two circular patterns and are received in inwardly inclined inner peripheral races 8 in a housing 6. The rollers 2 and 7 can rotate around their own axes but are stationarily held in a planetary cage 20 and, therefore, do not rotate around a shaft 1. Compression springs 5 engage the base ends of the rollers 2 and 7 and urge them outwardly in their seats. The central portions of the rollers are engaged by sun wheels 4 and 10 which are threadably received on the input actuating shaft 1. The input shaft 1 may be connected to a suitable driving motor or the like and it has threaded portions 11 and 12 thereon. The threaded portions 11 and 12 are received in the threaded holes in the sun wheels 4 and 10, respectively.

The housing 6 may have a suitable gear therearound to connect it to a load to be driven. The sun wheels 4 and 10 are urged apart by a spring 3 which is a compression type spring and urges the sun wheels 4 and 10 away from each other.

In the schematic view of the embodiment of the invention shown in FIG. 2, an actuating shaft 101 is similar to the actuating shaft shown in FIG. 1. The entire arrangement is similar except that the planetary rollers have their bases disposed outwardly and compression springs 105 and 105' are supported against collars 113 and 114 at their outer ends and against sun wheels 104 and 110 at their inner ends and they urge the sun wheels 104 and 110 toward each other on threaded portions 111 and 112 of the actuating shaft when the load decreases.

Frusto-conical shaped rollers 102 and 107 are supported in suitable bearings of the planetary cage as in the device shown in FIG. 1 except that the races of a housing 106 diverge outwardly. The input may be connected to the shaft 101 and the output may be taken off the outside of the housing 106 by a suitable gear, belt, or friction arrangement, or direct.

When the torque output is low as when the load on the vehicle is light, the sun wheels are held toward the small ends of the frusto-conical shaped rollers by the compression springs 105 and 105'. The planetary rollers are urged together by the tension spring 126.

In the embodiment shown in FIG. 3, another schematic view is shown wherein a housing 206 has suitable inner peripheral, outwardly converging races therein which receive frusto-conical shaped rollers 202 and 207. These planetary rollers are urged apart by compression springs 226. An output shaft 201 will be connected to a load to be driven and it has a collar 214 fixed thereto. Compression springs 205 are supported on the output shaft 201 and urge sun wheels 204 and 210 toward the large ends of the rollers.

The sun wheels 204 and 210 are threadably received on threaded portions 212 of the shaft 201 and are urged toward the center of the shaft by the helical compression springs 205. The collars 214 form a stop for the springs and the other ends of the springs engage the wheels 204 and 210.

The housing 206 is connected to the input through a suitable gear, belt, or friction means.

In the embodiment of the invention shown in FIG. 4, another schematic view is shown which is similar to that shown in the first three views; however, this view is the combination of a tension spring 326 which urges planetary rollers 302 and 307 toward each other. A compression spring 305 urges sun wheels 304 and 310 apart. An outside housing 306 is driven by a suitable belt, chain, or gear driving arrangement or direct and this drive will be transmitted through the frusto-conical shaped planetary rollers 302 and 307 to the output shaft through the sun wheels 304 and 310. The sun wheels will be driven at a greater or lesser rate, depending upon the position which they are moved to on the threaded shaft 301 to which the output is connected.

In the embodiment shown in FIG. 5, an actuating shaft 401 is shown connected to an output shaft 412 by a ratchet arrangement 422. The output shaft 412 has a gear 428 fixed to rotate with it and the gear 428 engages pinions 429 on the apex ends of frusto-conical rollers 407. Sun wheel 410 frictionally engages the outer periphery of the frusto-conical rollers 407. The sun wheel 410 is fixed to rotate with the shaft 401. Therefore, when the sun wheel 410 is in the position shown, it will form a direct drive through the ratchet 422 through the output shaft 412 but when it is moved to the left to the larger part of the frusto-conical shaped rollers 407, there will be an increase or step-up of drive through the sun wheel 410 and the planetary rollers and thence through the pinions 429 to the output shaft 412. The shaft 401 is a torsion bar which will take normal load without twisting, but will twist with load increased and, therefore, shortens.

In the increased load position, the wheel 410 will be moved to the left by the shaft 401 along the rollers 407 and as the vehicle accelerates and torque is reduced, the wheel 410 will be moved to the right to engage the ratchet 422 and thereby form a direct drive.

In the embodiment of the invention shown in FIG. 6, planetary rollers 502 and 507 are urged apart by compression springs 505. The load connected to an input shaft 501 drives through a sun wheel 521 to the rollers 502 through a housing 506 to the rollers 507 and a pinion 508 and a gear 509 to an output shaft 507'; then through the wheel 504 to the rollers 507, the pinion 508, and the gear 509 to the output shaft 507'. As the load is greatest at the outset, the speed reduction will be greatest when the sun wheels 504 and 521 engage the enlarged parts of the rollers 502 and 507 and as the load reduces, the sun wheels 504 and 521 will be moved outwardly on screw threads 512 and 512' until the ratchet teeth on the sun wheel 504 engage the ratchet teeth 522 on the gear 509 of the output shaft 507', thereby forming a direct drive through the transmission. In this transmission, the input and output have the same direction of rotation. A planetary cage 526 is stationary and serves as a housing in this case.

In the embodiment of the invention shown in FIG. 7, a design is shown for use on an automobile wherein a reverse shift is desirable. The transmission is contained in a housing 604a made up of housing members 630, 631, and 632. A clutch housing member 633 is fixed to the housing member 632 and an engine block 635.

The engine having the block 635 may be of an automobile engine and it supports a crankshaft 636 in a suitable main bearing therein. The crankshaft 636 has an outwardly directed flange 637 to which is fixed a clutch member 638. The clutch member 638 has a rearwardly directed flange 639 to which is fixed an inwardly directed flange 640.

A sleeve 641 is fixed to the clutch member 638 and rotates therewith. The sleeve 641 has external splined teeth 642 thereon which extend axially thereon and receive a movable clutch member 643. The clutch member 643 has an internal splined bore 644 which slidably receives the sleeve 641. A helical compression spring 645 is supported between the sleeve 641 and a C-washer 646 in a peripheral groove, the C-washer 646 holding the spring in place.

An actuating shaft 601 is rotatably received in its front end in a needle bearing 647 disposed in a bore 648 in the rear end of the crankshaft 636. The actuating shaft 601 has a splined portion 649 thereon which is slidably received in a splined bore 650 in a drive clutch plate 611. The drive clutch plate 611 has linings 652 and 653 which are in contact with plates 640 and 651 when the clutch is engaged.

Centrifugal planetarily located balls 612 are the actuating members and they are disposed between plates 638 and 651 so that when the centrifugal force exerted by the engine will cause the balls 612 to move outwardly, urging the movable clutch plate 651 rearwardly to force the drive clutch plate 611 into frictional engagement so that the shaft 601 will rotate with the engine.

In addition to the splined portion 649, the shaft 601 has a right hand threaded portion 656 and a left hand threaded portion 657 integral therewith. An intermediate journal part 658 is rotatably received in an anti-friction thrust bearing 659 and the bearing 659 is held between flange members 660 and 681 which may be in the form of C-washers supported in grooves in the shaft 601. The needle bearing 647 provides extra support for the shaft.

The rear end of the shaft 601 is carried by an anti-friction bearing 662 through a drive shaft 667. The bearing 662 is received in a counterbore 663 in the rear end of the housing member 630 and is held in place by a suitable retainer 664. The bearing 662 receives the hollow drive shaft 667 which has anti-friction sleeve bearings 668 and 669 therein which receive the rear end of the shaft 601 for relative rotation thereon and to support it.

The shifting part is made up of a forward sun wheel 604 and a rearward sun wheel 604', tapered planetary rollers 602 and 602' which are spaced around the actuating shaft, and ring housings 606 and 606'. The sun wheels have outwardly directed wheel portions 673 and 673' which engage the planetary rollers and cylindrical bearing surfaces 674 and 674'. The sun wheels have a threaded bore which mates with the threaded portions 656 and 657 on the actuating shaft and a bearing portion which rests on the cylindrical portion of the shaft 601.

The planetary rollers 602 and 602' are carried in bearings 675 and 676 and 675' and 676'. The bearings are self-located in a housing 618. The bearings 675 have flats outside and are received in peripherally spaced slots. The bearings can move freely radially to allow the rollers to seat on the sun wheels 602 and 602' and ring housings 606 and 606'.

The housings 618 and 618' (planetary-cage) are carried and freely rotate on anti-friction members 681' which freely rotate on the outer periphery of the cylindrical surfaces 674'. The housing 616 has outwardly disposed, axially aligned ratchet teeth 682 thereon. The ratchet teeth may engage ratchet teeth 683 on shifting members 619.

The shifting member 615 is splined to output shaft 667 and rotates with it but can slide along it. The shifting member 619 is splined to the housing of the transmission and is stationary (does not rotate) but can slide therein. The shifting members 615 and 619 are interconnected to a single shifting member. The members 615 and 619 have teeth on each side thereof. In the forward position shown, the teeth on the member 615 engage the teeth on a member 616 which is connected to the sun gear 617 and sun gear 617 is engaged with the gear portion (pinion) 689 of the planetary rollers 602. At the same time, teeth on the member 619 lock the ring assembly to the housing against rotation.

In the reverse position, the shifting member 615 locks the ring assembly to the output shaft 667 and the shifting member 619 locks the planetary assembly against rotation to the housing.

The outer periphery of the planetary rollers 602 and 602' forms frictional contact and holds sun wheels 604 and 604' against rotation when the torque transmitted to the output shaft is inadequate so that these members are threadably moved inwardly by the threads 656 and 657 until the speed ratio reaches a point when the torque will rotate the drive shaft 667. Therefore, the wheel portions 673 and 673' move either toward each other to the enlarged portions of the planetary rollers or, when the load lightens, they are urged by springs 605 and 605' away from each other to the smaller portions of the planetary rollers, thereby reducing the speed ratio or rate of rotation of the wheel portions 673 and 673' to the rollers 602 and 602'. The rollers roll inside the inner races 683 and 683' of the ring member and form rolling contact on the ring member.

As the engine accelerates and the balls 612 are urged outwardly, the clutch 611 will engage and the shaft 601 will be rotated in the bearings 659 and 662. If the load on the drive shaft 667 is heavy, the wheel portions 673 and 673' will not rotate with the shaft but will be moved toward each other.

When the force moving the sun wheels toward each other is balanced by the force of the springs, the unit will transmit force from the shaft 601 through the sun wheels to the rollers and from one roller 602' to the other roller 602 through the housing 618'. Through a pinion gear 689, the force will be transferred to gear 617, ratchet 616, and then through the shifting member 615 to the shaft 667. When the torque on the output shaft 667 is reduced to normal, the sun wheels will be moved outwardly. At this point, the sun wheel 604' will, through the ratchet part 617' thereon, engage the gear 617 directly and the unit will operate with a 1:1 ratio directly.

When the shifting members 615 and 619 are shifted to the left, they will allow the ring members 606 and 606' to rotate freely but will connect them to the drive shaft by means of the ratchet teeth 683'. The planetary housing 618 will be stationary and the planetary rollers will rotate around their axes. The device will operate in reverse.

FIG. 12 shows details of the design used in this transmission which eliminates wear of parts by releasing of the load on tapered rollers.

Another embodiment of the invention is shown in FIGS. 8a and 8b which eliminates wear on the wheels and tapered rollers by a special arrangement of the centrally supported bearing members. This arrangement provides release of the load on the tapered rollers and makes direct engagement between the input and the output. In this position, the r.p.m. of the wheels of the driven vehicle is the same as the r.p.m. of the drive gear.

The transmission is supported in a housing having parts 730, 731, 732, and 733 which are rigidly fixed together and have bearings 759 and 760 supported in counterbores therein which carry the transmission assembly therein. An actuating shaft 701 is supported in needle bearings 747 and 747' which are received in drive shafts 767 and 767', respectively. The shafts 767 and 767' could be fixed to the wheels of a vehicle to be driven.

A ring gear 753 is keyed to the actuating shaft 701 at 750 and rotates therewith and may be driven by a pinion on the end of a suitable driving shaft connected to an internal combustion engine or the like.

Inner race members 709 are supported on cylindrical portions 758 and 758' of the actuating shaft 701. The members 709 have inwardly diverging inclined surfaces which support bearing balls 778 and 778'. Outer races 777 and 777' are supported on the ring gear and their opposed surfaces form with the members 709' a bearing race for the balls 778 and 778'.

Self-adjusting sun wheels 704 and 720 have threaded bores and are received on opposed threaded portions 756 and 757 and freely slide thereon. The outer periphery of the planetary rollers frictionally engages the outer periphery of sun wheels 704 and 720. Planetary rollers 702 and 702' have their inner bearing ends supported in the planetary roller housings 710 and 710'. The outer ends of the planetary rollers 702 and 702' are carried on bearing members 718 and 718' which are a part of the planetary housings 710 and 710'. The members 718 and 718' freely rotate on needle bearings 768 and 768' carried on members 721 and 717'. The member 721 has a peripherally inwardly directed flange 714 having ratchet teeth 783 on the outer end thereof. The gear members 717' and 721 are engaged by pinions 784 and 784' of the planetary rollers 702 and 702' and are free to rotate on the shafts 767 and 767'. When shifting members 723 and 723' are engaged with ratchets 724 and 724', the transmission rotates forward. When the shifting members move to the phantom line position and are engaged with pinions 722 and 722' and disengaged from the ratchets 724 and 724', the transmission works in reverse.

In FIG. 8a, oil pressure may be applied through a threaded opening 790 to apply a pressure to the inner ends of the rollers 702 and 702' to supplement the force on spring 708 and 708'.

When the transmission shown in FIG. 8a is transmitting a low load, spring 705' will move the sun wheel 720 to the right and force the teeth 783 into engagement. The transmission will thereupon drive directly.

The spring 705' is of such length that in this position, it is exerting very little force. There is a substantial clearance between the race and the ring on the gear 753 so that when the force of the spring 705 drops to a low value relative to the force of the spring 708, the spring 708 will displace the ball 778 and the ring. This relieves the force on the roller 702' and it will rotate on the wheel 720 with low pre-load. Wear will be less on the parts.

In FIG. 8b, oil pressure could be applied to engage and disengage the planetary rollers 702 with the sun wheel 704 completely. In this case, the friction clutch to operate the unit is not required. The pressure is applied through the inlet opening 790 and is maintained while the transmission is in operation. The members 710, 708, and 709 act in this case as a restriction to oil leakage therebetween. The sun wheel in this case has no ratchet teeth and cannot be connected direct with the output as it is in FIG. 8a.

To disengage the unit, the pressure will be released in the inner space around the gear 753 by closing the inlet opening 790 and pressure will be applied in the outer space through an inlet 790'. In this case, the planetary rollers will be moved in the position when they are still engaged with the output through gear 717 but will be disengaged from the sun wheel 704. Neither of the planetary rollers will rotate around their own axis or around the shaft 701 but the sun wheel 704 and the shaft 701 will continue to rotate free due to the clearance developed between the sun wheel and the planetary rollers.

FIG. 9 shows another embodiment of the invention wherein a housing 833 supports drive shafts 867 and 867'. An actuating shaft 801 is attached to a gear 853 and is rotated thereby. Planetary housings 808 and 809 support planetary rollers 802 and 802'. Sun wheels 817 and 817' are free on the actuating shaft 801 and are moved inwardly and outwardly thereon as in the preceding embodiments.

Torsional rods 825 are attached at their ends to the sun wheels 817 and 817' and extend through spaced holes in the gear 853. The rods 825 also extend through an enlarged central bore in the planetary housings 808 and 809. Helical compression springs 820 and 820' urge the rollers toward engagement with the inner races in the housing.

The twist of the torsion bars 825 which are located planetarily around the shaft 801 will place the sun wheels in position dependent on torque. This unit can be used as a differential for an automobile with no provision for the reverse shift. Reverse shift can be provided then on the shaft before the transmission and could be very simple in design.

FIG. 10 shows an enlarged view of the planetary roller and sun wheel with the planetary wheel in the low torque position. The distance from the center line of the sun wheel 694 to the outer periphery of the bearing surface on the roller where it engages the inner race 683 is indicated at $R_2$ while the corresponding dimension from the center line of the wheel 604 to the other race 683 is indicated as $R_1$. The distance from the center line of the planetary roll to the engaging surface of the apex end of the planetary roller with the race 683 is indicated as $r_1$ and the corresponding dimension at the base end of the roller is indicated as $r_2$. The relation is $$\frac{r_1}{r_2} = \frac{R_1}{R_2}$$

In FIG. 11, the angular relation of the outer periphery of the planetary roller to the center line of the sun wheel is indicated as B while the angular relation of the apex at the contact with the outer race to the center line of the sun wheel is indicated as A. Selection of two different angles provides practical design to determine desired ratio.

The embodiment of the invention shown in FIG. 12 is an enlarged view of the load release arrangement of planetary rolls used in the transmission in FIG. 7.

Planetary rolls 904 and 904' are shown as having a bore which receives a telescoping journal member 905 which has an end journal which is received in an anti-friction thrust bearing 906. The bearing 906 is free to slide up and down in a thrust ring 908. The telescoping journal members contact each other on an angular surface 912 and have rolling contact only with no friction.

The position in which the rolls are shown is when load on the planetary rolls is released. When the sun wheels through compression springs 905' bring inner rings 909 together and balls 913 will move outer rings 908 apart and compress springs 911, the planetary rollers will be pre-loaded and the transmission will transmit a high load.

In the embodiment of the invention shown in FIG. 13, planetary rollers 135 are urged toward each other by a tension spring 138. Sun wheels 134 are urged toward each other by planetarily located torsion bars 136. Therefore, the threaded portion on the shaft is not required.

When the output torque is great, the torsion bars will be twisted and bend around the shaft and the sun wheels will move to the larger portion of the planetary rollers to overcome the load.

In the embodiment of the invention shown in FIG. 14, planetary rollers 145 are urged apart by a compression spring 148. Sun wheels 144 are urged toward each other by the torsion spring 146 and, therefore, the threaded portion on shaft 141 is not required.

When the output torque is great, the torsion spring 146 will move the sun wheel 144 to the smaller portion of the planetary assembly to overcome the load.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A transmission comprising a support, a first row of spaced frusto-conically shaped rollers and a second row of frusto-conically shaped rollers in said support, each of said rows of rollers being disposed with their axes in a conical path, an actuating shaft, said shaft being disposed with its center passing through the central axis of said conical path, said shaft having two spaced threaded portions, one having a right hand thread and the other a left hand thread, a self-adjusting sun wheel threadably received on each said threaded portion, the outside periphery of one said sun wheel frictionally engaging said rollers in one said row, the other said sun wheel frictionally engaging the outside periphery of said rollers in the other said row, means to drive said first row of frusto-conical rollers, and means to connect a load to be driven to the periphery of the other said row of rollers.

2. The transmission recited in claim 1 wherein the axis of each said roller is disposed at approximately a predetermined angle to the center of said actuating shaft.

3. The transmission recited in claim 1 wherein means is provided to move said rollers axially and the adjacent ends of the said rollers in one said row are in rolling contact with the inner ends of the rollers in the other said row.

4. The transmission recited in claim 1 wherein a resilient means is provided urging said sun wheels away from each other.

5. A transmission comprising two rows of frusto-conical shaped rolls, each row having their axes disposed in a conical path, sun wheels, one said sun wheel frictionally engaging one end of each said roll in one row and the other said sun wheel engaging an end of each said roll in the other row to rotate them, wheel means engaging the periphery of each said roll, an actuating shaft, moving means to move said rolls in one said row relative to the rolls in the other said row in proportion to the force applied to said means, and means including said actuating shaft to connect said transmission between a drive member and a driven member.

6. The transmission recited in claim 5 wherein means is provided to urge said wheel means toward the apex end of said rolls and said means to move said rolls urges said wheel means toward the base end of said rolls.

7. A transmission comprising a housing, an actuating shaft supported in said housing for rotation therein, driving means connected to said actuating shaft, spaced threaded portions on said actuating shaft, one a right hand thread and the other a left hand thread, two sun wheels, each having a threaded bore received one on each of said threaded portions, a first and a second spaced row of frusto-conical shaped rollers, the rollers in each said row being disposed with their axes in a conical path having its central axis on the axis of said actuating shaft, the outer periphery of each of said sun wheels frictionally engaging the periphery of said rollers in each of said rows, a helical compression spring between said sun wheels urging them toward the small ends of said rollers, said threads being inclined to urge said sun wheels toward the large ends of said rollers, bearing means concentric to said actuating shaft supporting the inner ends of said rollers, bearing means concentric to said actuating shaft supporting the outer ends of said rollers, a ring member frictionally engaging the outer periphery of said rollers, and means to connect a driven member to said ring member.

8. The transmission recited in claim 7 wherein the slope of the outer periphery of said rollers is a predetermined angle to the axis of said actuating shaft.

9. The transmission recited in claim 7 wherein the axes of said rollers are disposed at approximately a predetermined angle to the center of said actuating shaft.

10. The transmission recited in claim 9 wherein the ratio of the radius of the rolling surfaces of said rollers is equal to the ratio of the distance of the outside of said surfaces from the center of said shaft whereby rolling contact of said surfaces is provided.

11. The transmission recited in claim 7 wherein a shifting means is provided comprising means to connect said ring member to said shaft and said bearing means supporting one said set of rollers to said housing, said shifting means being shiftable to connect said bearing means to said shaft and said ring member to said housing.

12. The transmission recited in claim 11 wherein said ring member is a generally cylindrical hollow member rotatably supported in said housing and having said rollers therein having frictional rolling contact with the inside surface of said ring member.

13. The transmission recited in claim 12 wherein said ring member engages the outer periphery of said rollers.

14. A transmission comprising a housing, an actuating shaft supported in said housing for rotation therein, driving means connected to said actuating shaft, spaced threaded portions on said actuating shaft, one a right hand thread and the other a left hand thread, two sun wheels each having a threaded bore received one on each of said threaded portions, two spaced rows of frusto-conical shaped rollers, the rollers in each said row being disposed with their axes in a frusto-conical path concentric to said actuating shaft, the outer periphery of each of said sun wheels frictionally engaging the periphery of said rollers in each corresponding row, spaced helical compression springs on said shaft between said sun wheels urging them toward the small end of said rollers, said threads being inclined to urge said sun wheels toward the large end of said rollers, bearing means concentric to said actuating shaft supporting the inner ends of said rollers, bearing means concentric to said actuating shaft supporting the outer ends of said rollers, a ring member frictionally engaging the outer periphery of said rollers, and means to connect a driven member to said ring member.

15. The transmission recited in claim 14 wherein said driving means comprises a gear connected to said actuating shaft between said rows of rollers.

16. The transmission recited in claim 15 wherein fluid means is provided engaging the base of some of said rollers, and means to control the pressure of said fluid means to reduce the pressure of said rollers on said ring member.

17. The transmission recited in claim 14 wherein the apex ends of said rollers have peripheral gear surfaces engaging shifting members.

18. The transmission recited in claim 17 wherein additional gear surfaces on the apex ends of said rollers selectively engage said shifting members.

19. The transmission recited in claim 1 wherein
means is provided to apply a force to each said roller substantially axially thereof whereby said rollers are forced into engagement with said sun wheels and said means to connect a load to the other said row of rollers.

20. The transmission recited in claim 1 wherein
springs are disposed between each roller in one said row and a roller in another said row
whereby said rollers are forced into engagement with one of said sun wheels.

21. A transmission comprising
two rows of frusto-conical shaped rolls,
each said row having its axis disposed in a conical path,
sun wheels,
one said sun wheel engaging an end of a said roll in one row and the other said sun wheel engaging an end of a said roll in the other row to rotate them,
wheel means engaging the periphery of each said roll,
an actuating shaft,
moving means to move said rolls in one said row relative to the rolls in the other said row,
connecting means to connect a member to be driven to one of said actuating shaft and the outer periphery of said rolls,
and means to move said connecting means relative to each other along said conical path in proportion to a load applied to said shaft.

22. The transmission recited in claim 21 wherein
said connecting means has a cylindrical surface engaging said wheels connecting said outer periphery of said rolls.

References Cited by the Examiner
UNITED STATES PATENTS

| | | | |
|---|---|---|---|
| 1,234,868 | 7/1917 | Bynoe | 74—796 |
| 2,886,986 | 5/1959 | Kopp | 74—796 |

FOREIGN PATENTS

| | | |
|---|---|---|
| 923,107 | 2/1947 | France. |
| 484,497 | 9/1953 | Italy. |
| 517,001 | 2/1955 | Italy. |

DON A. WAITE, *Primary Examiner.*

SAMUEL SPINTMAN, BROUGHTON G. DURHAM,
*Examiners.*